April 26, 1927.

G. M. KRAUSS

CALF WEANER

Filed Feb. 8, 1926

1,626,090

INVENTOR
G. M. Krauss
BY
ATTORNEYS

Patented Apr. 26, 1927.

1,626,090

UNITED STATES PATENT OFFICE.

GEORGE MICHAEL KRAUSS, OF LINGLE, WYOMING.

CALF WEANER.

Application filed February 8, 1926. Serial No. 86,385.

My invention relates to improvements in calf weaners, and it consists in the combinations, constructions, and arrangements herein described and claimed.

An object of my invention is to provide a calf weaner which may be readily inserted in the calf's nose and fastened in place without harming the calf, and which is provided with novel means consisting of flaps for covering the sides of the calf's mouth for preventing the calf from sucking the cow which would likely happen if the flaps were not provided, because the body portion could possibly be twisted to the side of the calf's mouth, thus permitting the calf to suck the cow.

A further object of my invention is to provide a calf weaner of the type described which is extremely simple in construction, and which is adjustable, whereby the device may be readily applied to different calves.

Other objects and advantages will appear in the following specification, and the novel features of the invention will be particularly pointed out in the appended claims.

My invention is illustrated in the accompanying drawings, forming part of this application, in which—

Figure 1:
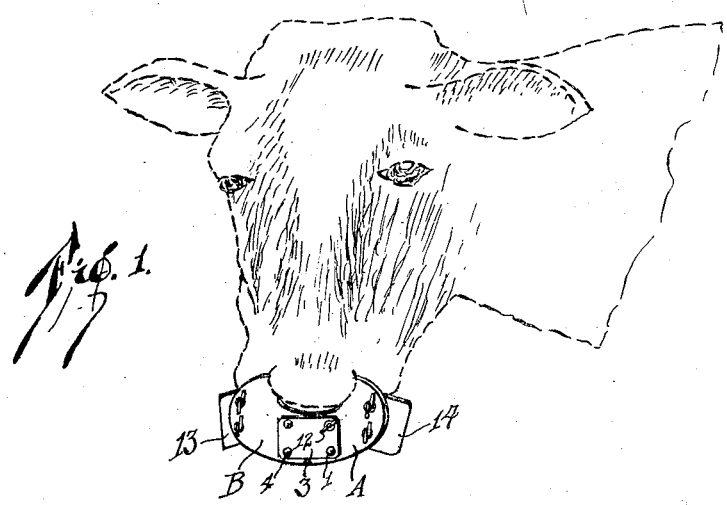
Figure 2:
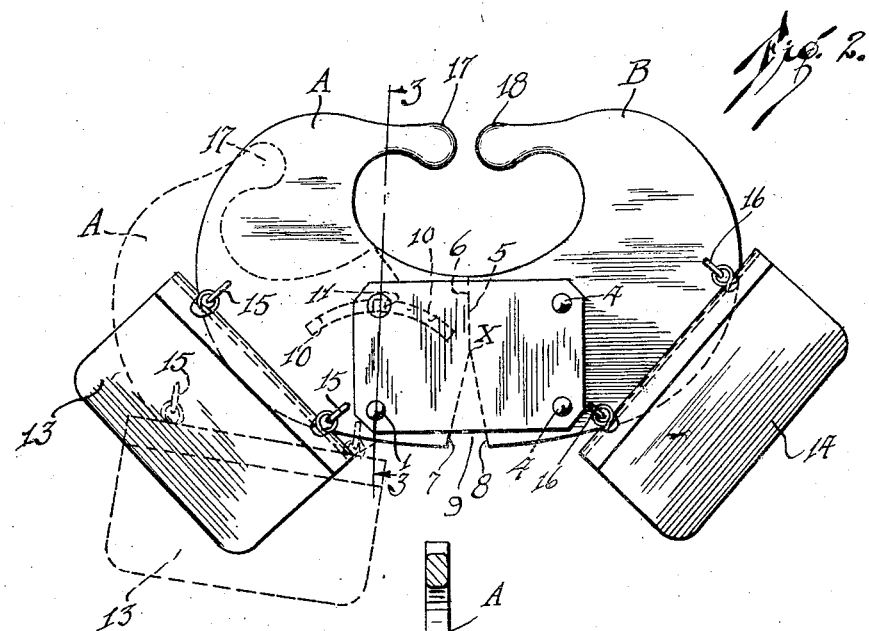
Figure 3:

Figure 1 is a perspective view of the device shown operatively applied to a calf, Figure 2 is a plan view of the device, and Figure 3 is a section along the line 3—3 of Figure 2.

In carrying out my invention, I provide a body portion consisting of two identical sections A and B. The section A is pivotally secured at 1 to guide members 2 and 3. The members 2 and 3 are securely fastened to the part B by rivets 4, or other like fastening means.

When the parts A and B are in closed position, the edges 5 and 6 of the parts A and B contact with each other, as is clearly shown in Figure 2. From the point $x$, the edges 5 and 6 taper away from each other as at 7 and 8, thus providing a space 9 for permitting the part A to be swung away from the part B into open position, as shown by the dotted lines in Figure 2. The part A is provided with an arcuate-shaped slot 10 for permitting the part A to be moved with respect to the part B.

The means for securing the part A in adjusted position with respect to the part B is clearly shown in Figure 3 and consists of a square bolt 11 that is slidably received in the slot 10 and a wing nut 12 which is used for clamping the part A to the guide members 2 and 3, whereby the part A is locked in adjusted position. Any type of bolt will do other than a wing bolt.

In Figure 2, I also show flaps 13 and 14 as being pivotally secured to the parts A and B and 15 and 16, respectively. In the drawings the flaps abut the edges of the parts A and B whereby they are held against forward movement, I show links pivotally securing the flaps 13 and 14 in place, but it is obvious that any other type of construction may be employed for hingedly securing the flaps to the parts A and B. The flaps are inclined at an angle with respect to one another for a purpose hereinafter described.

From the foregoing description of the various parts of the device, the operation thereof may be readily understood. In Figure 1, I show the device operatively applied to a calf. In applying the device, the wing nut 12 is first loosened and then the part A is swung into open position, whereupon the nibs 17 and 18 may be inserted in the calf's nose, and after the nibs have been forced beyond the thicker portion of the calf's nose, the parts A and B may be swung toward each other, as shown by the full line position in Figure 2, and then the wing nut tightened for locking the device in place.

The device is applied in such a manner that the body portion will hang down the front of the calf's mouth and the flaps 13 and 14 will hang along the sides of the calf's mouth. Of course the device will pivot about the nibs 17 and 18 for permitting the calf to drag the device over the ground, thus freeing its mouth to enable it to eat grass, etc., but as soon as the calf raises its head to suck the cow, the body portion will drop over the calf's mouth due to gravity and will prevent the calf from doing so. Moreover, if the calf should turn its head in an effort to swing the body portion to the side of its mouth, the uppermost flap would drop down over the calf's mouth due to gravity, and would still prevent the calf from sucking the cow.

It will be seen from this construction that I provide a novel and simple means for preventing a calf from sucking a cow, this means being instantly adjustable to fit different calves, and for permitting the device to be readily removed from the calf's nose when desired.

While I have shown and described flaps as being used with the device, it will be understood that the flaps might be dispensed with and still provide an efficient device to constitute a calf weaner.

I claim:

1. A calf weaner comprising a body portion consisting of two identical parts, guide members securing said parts together, one of said parts being pivotally secured to said guide members and having an arcuate-shaped slot therein, and means disposed in said slot for securing said part in adjusted position.

2. A calf weaner comprising a body portion consisting of two identical parts, means carried by said parts for securing said body portion to a calf's nose, and a flap pivotally secured to each part of said body portion, said flaps being positioned so as to abut said parts, whereby said flaps are held against forward movement.

GEORGE MICHAEL KRAUSS.